United States Patent
Kang et al.

(10) Patent No.: US 9,643,473 B2
(45) Date of Patent: May 9, 2017

(54) HEAT PUMP SYSTEM FOR VEHICLES

(71) Applicant: HALLA VISTEON CLIMATE CONTROL CORP., Daejeon (KR)

(72) Inventors: Sung Ho Kang, Daedeok-gu (KR); Hak Kyu Kim, Daejeon (KR); Young Ho Choi, Daejeon (KR); Jung Jae Lee, Daejeon (KR); Sang Ki Lee, Daejeon (KR); Youn Woo Lim, Daejeon (KR)

(73) Assignee: HANON SYSTEMS, Daejeon-Si (KR)

( * ) Notice: Subject to any disclaimer, the term of this patent is extended or adjusted under 35 U.S.C. 154(b) by 254 days.

(21) Appl. No.: 14/227,147

(22) Filed: Mar. 27, 2014

(65) Prior Publication Data

US 2015/0273981 A1    Oct. 1, 2015

(51) Int. Cl.
| | | |
|---|---|---|
| *F25B 27/00* | (2006.01) | |
| *B60H 1/32* | (2006.01) | |
| *B60H 3/02* | (2006.01) | |
| *B60H 1/00* | (2006.01) | |
| *F25B 5/02* | (2006.01) | |
| *F25B 5/04* | (2006.01) | |
| *F25B 6/04* | (2006.01) | |

(52) U.S. Cl.
CPC ....... *B60H 1/3207* (2013.01); *B60H 1/00921* (2013.01); *B60H 3/024* (2013.01); *F25B 5/02* (2013.01); *F25B 5/04* (2013.01); *F25B 6/04* (2013.01); *F25B 2400/0403* (2013.01); *F25B 2400/0409* (2013.01); *F25B 2400/0411* (2013.01)

(58) Field of Classification Search
CPC .. B60H 1/00921; B60H 3/024; B60H 1/3207; F25B 30/00; F25B 5/02; F25B 5/04; F25B 2400/0411; F25B 2400/0403; F25B 2400/0409

See application file for complete search history.

(56) References Cited

U.S. PATENT DOCUMENTS

| 8,864,616 B2 | 10/2014 | Greiss et al. |
| 2010/0326127 A1 | 12/2010 | Oomura et al. |

(Continued)

FOREIGN PATENT DOCUMENTS

| CN | 103303097 A | 9/2013 |
| CN | 104833129 A | 8/2015 |

(Continued)

OTHER PUBLICATIONS

European Search Report dated Sep. 22, 2014.

*Primary Examiner* — Len Tran
*Assistant Examiner* — Ana Vazquez
(74) *Attorney, Agent, or Firm* — Dickinson Wright PLLC

(57) ABSTRACT

A heat pump system for a vehicle includes a dehumidification line for supplying some refrigerant circulating in a refrigerant circulation line to an evaporator before the refrigerant is introduced into an exterior heat exchanger after passing a first expansion means so as to dehumidify the interior of the vehicle in a heat pump mode, thereby allowing the refrigerant to smoothly flow to the evaporator at a low pressure through the dehumidification line before the refrigerant is introduced into the exterior heat exchanger which has a higher pressure than the evaporator when the interior of the vehicle is dehumidified, and smoothly dehumidifying the inside of the vehicle.

10 Claims, 9 Drawing Sheets

(56) References Cited

U.S. PATENT DOCUMENTS

| | | | |
|---|---|---|---|
| 2012/0227431 A1* | 9/2012 | Wang | B60H 1/00921 62/238.7 |
| 2013/0081419 A1* | 4/2013 | Katoh | B60H 1/004 62/278 |
| 2013/0227984 A1 | 9/2013 | Tsunoda et al. | |
| 2015/0217625 A1 | 8/2015 | Kang et al. | |

FOREIGN PATENT DOCUMENTS

| | | |
|---|---|---|
| EP | 2636548 A1 | 9/2013 |
| WO | 2012137468 A1 | 10/2012 |

\* cited by examiner

Prior Art

Prior Art

HEAT PUMP SYSTEM FOR VEHICLES

BACKGROUND OF THE INVENTION

Field of the Invention

The present invention relates to a heat pump system for a vehicle, and more particularly, to a heat pump system for a vehicle, which includes a dehumidification line for supplying some of refrigerant circulating a refrigerant circulation line to an evaporator before the refrigerant is introduced into an exterior heat exchanger after passing a first expansion means so as to dehumidify the interior of the vehicle in a heat pump mode, thereby allowing the refrigerant to smoothly flow to the evaporator of a low pressure through the dehumidification line before the refrigerant is introduced into the exterior heat exchanger which has a higher pressure than the evaporator when the interior of the vehicle is dehumidified, and smoothly dehumidifying the inside of the vehicle.

Background Art

In general, an air conditioner for a vehicle includes a cooling system for cooling the interior of the vehicle and a heating system for heating the interior of the vehicle. At an evaporator side of a refrigerant cycle, the cooling system converts air into cold air by heat-exchanging the air passing outside an evaporator with refrigerant flowing inside the evaporator so as to cool the interior of the vehicle. At a heater core side of a cooling water cycle, the heating system convers air into warm air by heat-exchanging the air passing outside the heater core with cooling water flowing inside the heater core so as to heat the interior of the vehicle.

In the meantime, differently from the air conditioner for the vehicle, a heat pump system which can selectively carry out cooling and heating by converting a flow direction of refrigerant using one refrigerant cycle has been applied. For instance, the heat pump system includes two heat exchangers: one being an interior heat exchanger mounted inside an air-conditioning case for heat-exchanging with air blown to the interior of the vehicle; and the other one being an exterior heat exchanger for heat-exchanging outside the air-conditioning case, and a direction-adjustable valve for changing a flow direction of refrigerant. Therefore, according to the flow direction of the refrigerant by the direction-adjustable valve, the interior heat exchanger serves as a heat exchanger for cooling when the cooling mode is operated, and serves as a heat exchanger for heating when the heating mode is operated.

Various kinds of the heat pump system for the vehicle have been proposed, and FIG. 1 illustrates a representative example of the heat pump system for the vehicle.

As shown in FIG. 1, the heat pump system for the vehicle includes: a compressor 30 for compressing and discharging refrigerant; an interior heat exchanger 32 for radiating heat of the refrigerant discharged from the compressor 30; a first expansion valve 34 and a first bypass valve 36 mounted in parallel for selectively passing the refrigerant passing through the interior heat exchanger 32; an exterior heat exchanger 48 for heat-exchanging the refrigerant passing through the first expansion valve 34 or the first bypass valve 36 outdoors; an evaporator 60 for evaporating the refrigerant passing through the exterior heat exchanger 48; an accumulator 62 for dividing the refrigerant passing through the evaporator 60 into a gas-phase refrigerant and a liquid-phase refrigerant; an inside heat exchanger 50 for heat-exchanging refrigerant supplied to the evaporator 60 with refrigerant returning to the compressor 30; a second expansion valve 56 for selectively expanding the refrigerant supplied to the evaporator 60; and a second bypass valve 58 mounted in parallel with the second expansion valve 56 for selectively connecting an outlet side of the exterior heat exchanger 48 and an inlet side of the accumulator 62.

In FIG. 1, the reference numeral 10 designates an air-conditioning case in which the interior heat exchanger 32 and the evaporator 60 are embedded, the reference numeral 12 designates a temperature-adjustable door for controlling a mixed amount of cold air and warm air, and the reference numeral 20 designates a blower mounted at an inlet of the air-conditioning case.

According to the heat pump system having the above structure, when a heat pump mode (heating mode) is operated, the first bypass valve 36 and the second expansion valve 56 are closed, and the first expansion valve 34 and the second bypass valve 58 are opened. Moreover, the temperature-adjustable door 12 is operated as shown in FIG. 1. Accordingly, the refrigerant discharged from the compressor 30 passes through the interior heat exchanger 32, the first expansion valve 34, the exterior heat exchanger 48, a high pressure side 52 of the inside heat exchanger 50, the second bypass valve 58, the accumulator 62, and a low pressure side 54 of the inside heat exchanger 50 in order, and then, is returned to the compressor 30. That is, the interior heat exchanger 32 serves as a heater and the exterior heat exchanger 48 serves as an evaporator.

When an air-conditioning mode (cooling mode) is operated, the first bypass valve 36 and the second expansion valve 56 are opened, and the first expansion valve 34 and the second bypass valve 58 are closed. Furthermore, the temperature-adjustable door 12 closes a passage of the interior heat exchanger 32. Therefore, the refrigerant discharged from the compressor 30 passes through the interior heat exchanger 32, the first bypass valve 36, the exterior heat exchanger 48, the high pressure side 52 of the inside heat exchanger 50, the second expansion valve 56, the evaporator 60, the accumulator 62, and the low pressure side 54 of the inside heat exchanger 50 in order, and then, is returned to the compressor 30. That is, the evaporator 360 serves as an evaporator and the interior heat exchanger 32 closed by the temperature-adjustable door 12 serves as a heater in the same with the heat pump mode.

However, in case of the conventional heat pump system for the vehicle, in the heat pump mode (heating mode), the interior heat exchanger 32 mounted inside the air-conditioning case 10 serves as a heater so as to carry out heating, and the exterior heat exchanger 48 mounted outside the air-conditioning case 10, namely, at the front side of an engine room of the vehicle, serves as an evaporator which exchanges heat with the outdoor air.

In this instance, if temperature of the refrigerant introduced into the exterior heat exchanger 48 is higher than temperature of the outdoor air, in other words, if temperature of the refrigerant is low, the exterior heat exchanger 48 cannot absorb heat from the outdoor air and is deteriorated in heat-exchange efficiency due to frosting on the exterior heat exchanger 48, and hence, the heat pump system is deteriorated in heating performance and efficiency.

In order to solve the above problems, referring to FIG. 2, a heat pump system for a vehicle disclosed in Korean Patent Publication No. 10-2012-0103054 which has been filed by the same inventor as the present invention will be described in brief. The heat pump system for the vehicle includes: a compressor 70 mounted on a refrigerant circulation line 91 for compressing and discharging refrigerant; an interior heat exchanger 71 mounted inside an air-conditioning case 80 and connected with the refrigerant circulation line 91 of an outlet side of the compressor 70 for exchanging heat between air flowing inside the air-conditioning case 80 and the refrigerant discharged from the compressor 70; an evaporator 75 mounted inside the air-conditioning case 80 and connected with the refrigerant circulation line 91 of an inlet side of the compressor 70 for exchanging heat between the air flowing inside the air-conditioning case 80 and the refrigerant supplied to the compressor 70; an exterior heat exchanger 73 mounted outside the air-conditioning case 80 for exchanging heat between the refrigerant circulating through the refrigerant circulation line 91 and the outdoor air; first expansion means 72 mounted on the refrigerant circulation line 91 of an inlet side of the exterior heat exchanger 73 for selectively expanding refrigerant supplied to the exterior heat exchanger 83 according to the air-conditioning mode or the heat pump mode; second expansion means 74 mounted on the refrigerant circulation line 91 of an inlet side of the evaporator 75 for expanding refrigerant supplied to the evaporator 75; a first bypass line 92 mounted for connecting the refrigerant circulation line 91 of the inlet side of the second expansion means 74 and the refrigerant circulation line 91 of the outlet side of the evaporator 75 with each other such that the refrigerant bypasses the second expansion means 74 and the evaporator 75; and a first direction changing valve 90 mounted at a branching point of the first bypass line and the refrigerant circulation line 91 for changing a flow direction of the refrigerant, such that the refrigerant passing the exterior heat exchanger 73 flows to the first bypass line 92 or the second expansion means 74 according to the air-conditioning mode or the heat pump mode.

Moreover, in order to dehumidify the interior of the vehicle in the heat pump mode, a dehumidification line 94 is mounted for connecting the first bypass line 92 and the refrigerant circulation line 91 of the inlet side of the evaporator 75 with each other so as to flow some of the refrigerant flowing in the first bypass line 92 toward the evaporator 75, and an on-off valve 94*a* is mounted on the dehumidification line 94.

Furthermore, a second bypass line 93 is mounted in such a way that the refrigerant passing the first expansion means 72 bypasses the exterior heat exchanger 73.

Therefore, under the condition that outdoor temperature is below zero or that frosting is generated on the exterior heat exchanger 73, because the refrigerant bypasses the exterior heat exchanger 73 through the second bypass line 93, it minimizes an influence of the outdoor air of low temperature, and additionally, the heat pump system can be operated smoothly and enhance heating performance because recovering waste heat of electronic units through heat feeding means 76.

Additionally, in the heat pump mode, if it is necessary to dehumidify the interior of the vehicle, the on-off valve 94*a* of the dehumidification line 94 is opened, and then, the refrigerant expanded in the first expansion means 72 flows to the first bypass line 92 through the exterior heat exchanger 73. In this instance, some of the refrigerant flowing to the first bypass line 92 is branched to the dehumidification line 94 and is supplied to the evaporator 75 so as to carry out dehumidification of the interior of the vehicle.

However, the refrigerant expanded in the first expansion means 72 is heat-exchanged with the cold outdoor air and lowers pressure while passing through the exterior heat exchanger 73. Because the evaporator 75 has little refrigerant in the heat pump mode, finally, based on the on-off valve 94*a* of the dehumidification line 94 of FIG. 2, pressure of an A side becomes lower than pressure of a B side (evaporator), and hence, the refrigerant flowing in the first bypass line 92 in the dehumidification mode does not flow to the evaporator 75 and flows backwardly. Therefore, it is impossible to dehumidify the interior of the vehicle.

SUMMARY OF THE INVENTION

Accordingly, the present invention has been made to solve the above-mentioned problems occurring in the prior arts, and it is an object of the present invention to provide a heat pump system for a vehicle, which includes a dehumidification line for supplying some of refrigerant circulating a refrigerant circulation line to an evaporator before the refrigerant is introduced into an exterior heat exchanger after passing a first expansion means so as to dehumidify the interior of the vehicle in a heat pump mode, thereby allowing the refrigerant to smoothly flow to the evaporator of a low pressure through the dehumidification line before the refrigerant is introduced into the exterior heat exchanger which has a higher pressure than the evaporator when the interior of the vehicle is dehumidified, and smoothly dehumidifying the inside of the vehicle.

To achieve the above objects, the present invention provides a heat pump system for a vehicle including: a compressor mounted on a refrigerant circulation line for compressing and discharging refrigerant; an interior heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; an exterior heat exchanger mounted outside the air-conditioning case for exchanging heat between the refrigerant circulating through the refrigerant circulation line and the outdoor air; first expansion means mounted on the refrigerant circulation line located between the interior heat exchanger and the exterior heat exchanger for expanding refrigerant; second expansion means mounted on the refrigerant circulation line of an inlet side of the evaporator for expanding refrigerant; a bypass line mounted in such a way as to connect the refrigerant circulation line of an inlet side of the second expansion means and the refrigerant circulation line of an outlet side of the evaporator, such that refrigerant bypasses the second expansion means and the evaporator in a heat pump mode; and a dehumidification line mounted on the refrigerant circulation line for supplying some of the refrigerant circulating the refrigerant circulation line to the evaporator so as to dehumidify the interior of the vehicle in the heat pump mode, wherein the dehumidification line supplies some of the refrigerant passing the first expansion means to the evaporator.

According to the preferred embodiment of the present invention, the heat pump system for the vehicle includes the dehumidification line for supplying some of refrigerant circulating the refrigerant circulation line to the evaporator before the refrigerant is introduced into the exterior heat exchanger after passing the first expansion means so as to dehumidify the interior of the vehicle in the heat pump mode, thereby allowing the refrigerant to smoothly flow to the evaporator of a low pressure through the dehumidification line before the refrigerant is introduced into the exterior heat exchanger which has a higher pressure than the evaporator when the interior of the vehicle is dehumidified, and smoothly dehumidifying the inside of the vehicle.

Moreover, a bypass flow channel of the expansion valve to which the dehumidification line is connected is formed collinearly with an outlet of a first flow channel so as to minimize a pressure loss and a flow noise of the refrigerant.

Furthermore, a controller for controlling the on-off valve of the dehumidification line is mounted in order to judge frosting of the evaporator in the dehumidification mode or turn off the on-off valve when frosting is sensed, such that the heat pump system can prevent frosting of the evaporator.

Additionally, a pipe diameter of the dehumidification line is smaller than a pipe diameter of the refrigerant circulation line of the outlet side of the first expansion means or a pipe of the dehumidification line is connected in such a way as to be branched above a pipe of the refrigerant circulation line, such that a flow amount of the refrigerant branched from the refrigerant circulation line to the dehumidification line is relatively small so as to secure heating performance.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
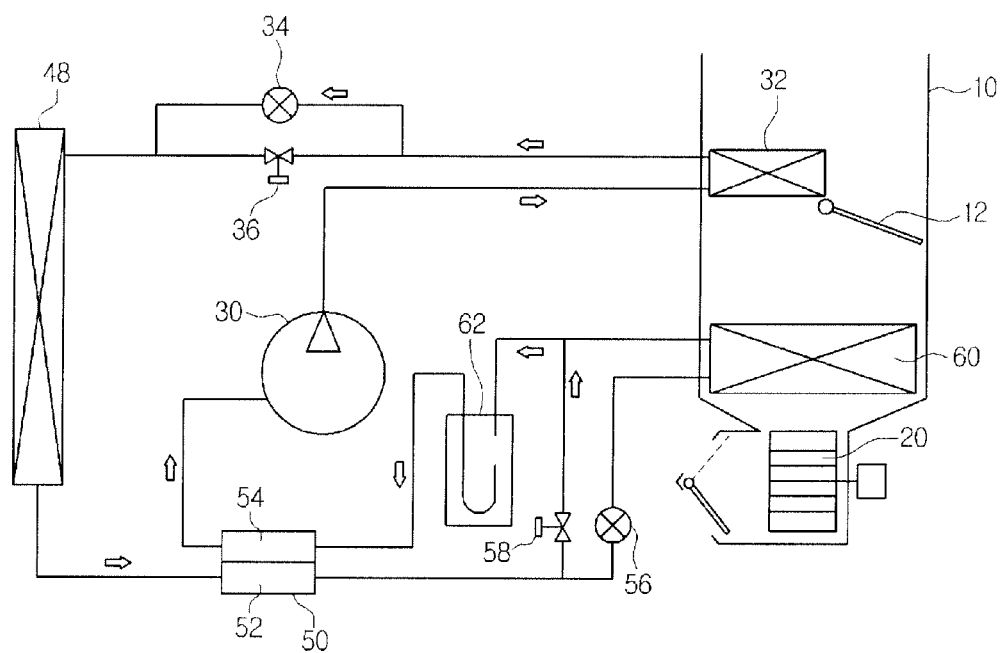
FIG. 1 is a configurative diagram of a conventional heat pump system for a vehicle.
Figure 2:
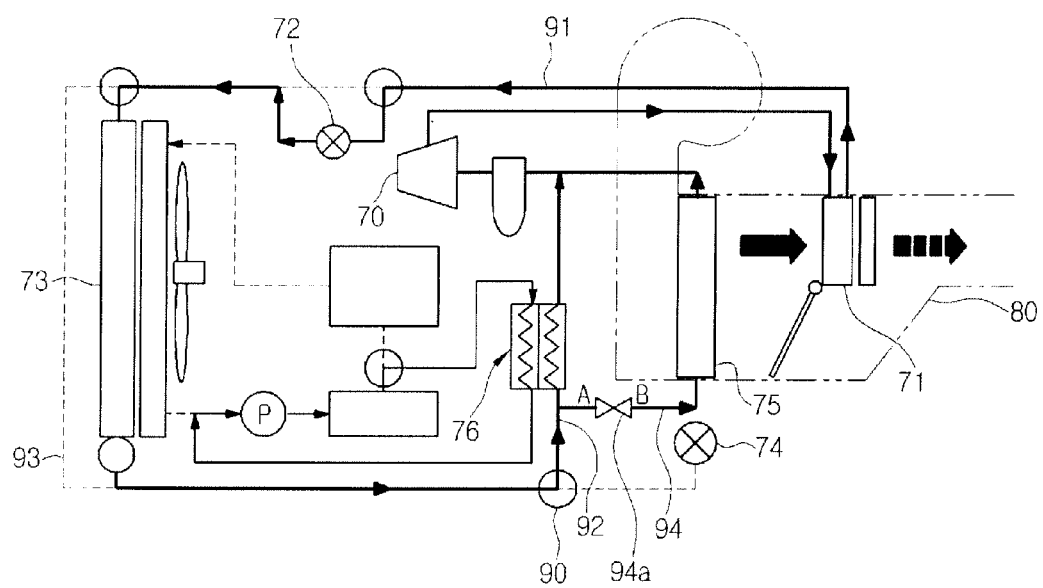
FIG. 2 is a configurative diagram of another conventional heat pump system for a vehicle.

Reference will be now made in detail to the preferred embodiment of the present invention with reference to the attached drawings.

First, a heat pump system for a vehicle according to the present invention includes a compressor 100, an interior heat exchanger 110, first expansion means 120, an exterior heat exchanger 130, second expansion means 140, and an evaporator 160 which are connected on a refrigerant circulation line (R) in order, and is preferably applied to electric vehicles or hybrid vehicles.

Moreover, on the refrigerant circulation line (R), a bypass line (R1) bypassing the second expansion means 140 and the evaporator 160, an auxiliary bypass line (R2) bypassing the exterior heat exchanger 130, and an expansion line (R3) on which the first expansion means 120 is mounted are respectively connected in parallel.

Furthermore, a first direction changing valve 191 is mounted at a branching point of the bypass line (R1), a second direction changing valve 192 is mounted at a branching point of the auxiliary bypass line (R2), and a two-way valve 122 is mounted at a branching point of the expansion line (R3).

Figure 3:
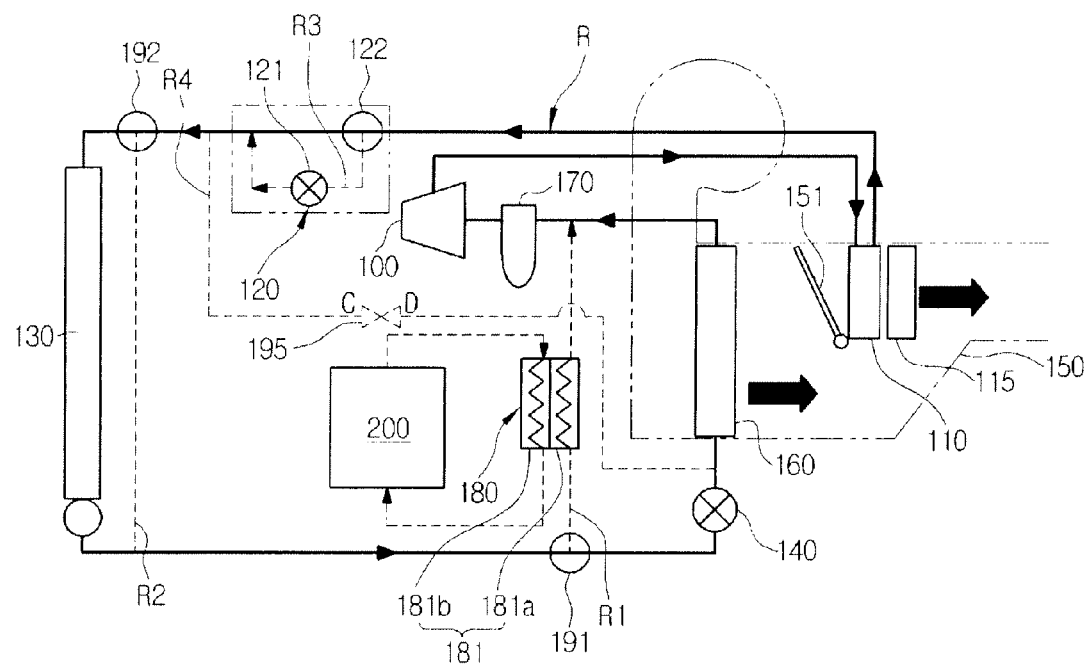
FIG. 3 is a configurative diagram of an air-conditioning mode of a heat pump system for a vehicle according to a preferred embodiment of the present invention.

Therefore, in an air-conditioning mode, as shown in FIG. 3, the refrigerant discharged from the compressor 100 circulates through the interior heat exchanger 110, the exterior heat exchanger 130, the second expansion means 140, the evaporator 160, and the compressor 100 in order.

In this instance, the interior heat exchanger 110 serves as a condenser and the evaporator 160 serves as an evaporator.

Meanwhile, the exterior heat exchanger 130 also serves as a condenser like the interior heat exchanger 110.

Figure 4:
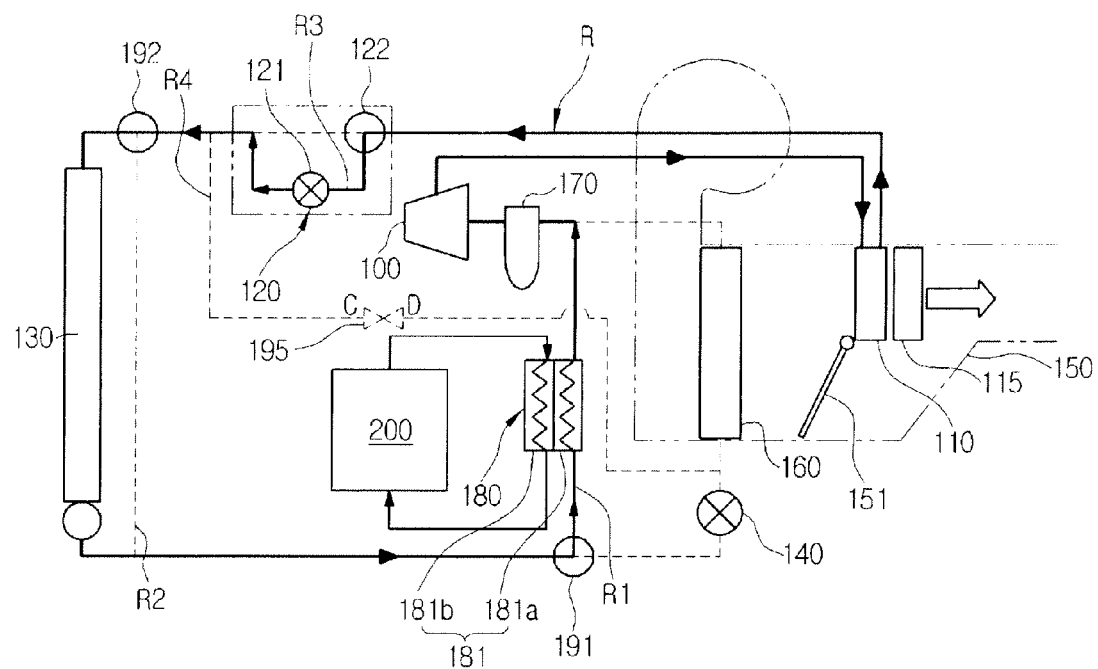
FIG. 4 is a configurative diagram of a first heating mode of a heat pump mode of the heat pump system for the vehicle according to the preferred embodiment of the present invention.

In a heat pump mode (first heating mode), as shown in FIG. 4, the refrigerant discharged from the compressor 100 circulates through the interior heat exchanger 110, an orifice 121 of the first expansion means 120, the exterior heat exchanger 130, the bypass line (R1), and the compressor 100 in order.

In this instance, the interior heat exchanger 110 serves as a condenser and the exterior heat exchanger 130 serves as an evaporator. The refrigerant is not supplied to the second expansion means 140 and the evaporator 160.

In the meantime, when the interior of the vehicle is dehumidified in the heat pump mode, some of the refrigerant circulating in the refrigerant circulation line (R) is supplied to the evaporator 160 through a dehumidification line (R4) which will be described later, such that the interior of the vehicle is dehumidified.

As described above, the heat pump system according to the preferred embodiment of the present invention can commonly use the refrigerant circulation line (R) because the air-conditioning mode and the heat pump mode have the same circulation direction of the refrigerant, prevent stagnation of refrigerant, and simplify the refrigerant circulation line (R).

Hereinafter, components of the heat pump system for the vehicle according to the present invention will be described in detail.

First, the compressor 100 mounted on the refrigerant circulation line (R) inhales and compresses refrigerant while operating by receiving a driving force from an engine (an internal combustion engine) or a motor, and then, discharges the refrigerant in a gas phase of high-temperature and high-pressure.

The compressor 100 inhales and compresses the refrigerant discharged from the evaporator 160 and supplies to the interior heat exchanger 110 in the air-conditioning mode, and inhales and compresses the refrigerant discharged from the exterior heat exchanger 130 and passing through the bypass line (R1) and supplies to the interior heat exchanger 110 in the heat pump mode.

Moreover, in the dehumidification mode of the heat pump mode, because refrigerants are simultaneously supplied to the evaporator 160 through the bypass line (R1) and the dehumidification line (R4), the compressor 100 inhales and compresses the refrigerants meeting after passing through the bypass line (R1) and the evaporator 160 and supplies the inhaled refrigerant to the interior heat exchanger 110.

The interior heat exchanger 110 is mounted inside the air-conditioning case 150 and connected with the refrigerant circulation line (R) of the outlet side of the compressor 100 so as to heat-exchange air flowing inside the air-conditioning case 150 with the refrigerant discharged from the compressor 100.

Furthermore, the evaporator 160 is mounted inside the air-conditioning case 150 and connected with the refrigerant circulation line (R) of the inlet side of the compressor 100 so as to heat-exchange the air flowing inside the air-conditioning case 150 with the refrigerant supplied to the compressor 100.

The interior heat exchanger 110 serves as a condenser all in the air-conditioning mode and the heat pump mode.

The evaporator 160 serves as an evaporator in the air-conditioning mode, but is stopped in the first and second heating modes of the heat pump mode because refrigerant is not supplied and serves as an evaporator in the dehumidification mode because some of the refrigerant is supplied.

Moreover, the interior heat exchanger 110 and the evaporator 160 are spaced apart from each other at a predetermined interval inside the air-conditioning case 150, and in this instance, are mounted in order from the upstream side of the air flow direction inside the air-conditioning case 150.

Therefore, in the air-conditioning mode that the evaporator 160 serves as the evaporator, as shown in FIG. 3, the refrigerant of low-temperature and low-pressure discharged from the second expansion means 140 is supplied to the evaporator 160, and in this instance, the air flowing inside the air-conditioning case 150 through the blower (not shown) is converted into cold air by exchanging heat with the refrigerant of low-temperature and low-pressure of the evaporator 160 while passing through the evaporator 160, and then, is discharged to the interior of the vehicle to thereby cool the interior of the vehicle.

In the heat pump mode (first heating mode) that the interior heat exchanger 110 serves as a condenser, as shown in FIG. 4, the refrigerant of high-temperature and high-pressure discharged from the compressor 100 is supplied to the interior heat exchanger 110, and in this instance, the air flowing inside the air-conditioning case 150 through the blower (not shown) is converted into warm air by exchanging heat with the refrigerant of high-temperature and high-pressure of the interior heat exchanger 110 while passing through the interior heat exchanger 110, and then, is discharged to the interior of the vehicle to thereby heat the interior of the vehicle.

In the meantime, it is preferable that the evaporator 160 is larger than the interior heat exchanger 110.

Moreover, a temperature-adjustable door 151 for adjusting an amount of air bypassing the interior heat exchanger 110 and an amount of air passing through the interior heat exchanger 110 is mounted between the evaporator 160 and the interior heat exchanger 110 inside the air-conditioning case 150.

The temperature-adjustable door 151 adjusts the amount of the air bypassing the interior heat exchanger 110 and the amount of the air passing through the interior heat exchanger 110 to thereby properly control temperature of the air discharged from the air-conditioning case 150.

In this instance, in the air-conditioning mode, as shown in FIG. 3, when a front side passage of the interior heat exchanger 110 is completely closed by the temperature-adjustable door 151, because the cold air passing through the evaporator 160 bypasses the interior heat exchanger 110 and is supplied to the interior of the vehicle, the maximum heating is carried out.

In the heat pump mode (first heating mode), as shown in FIG. 4, when a passage bypassing the interior heat exchanger 110 is completely closed by the temperature-adjustable door 151, because all of the air is converted into warm air while passing through the interior heat exchanger 110 serving as the condenser and the warm air is supplied to the interior of the vehicle, the maximum heating is carried out.

Furthermore, the exterior heat exchanger 130 is mounted outside the air-conditioning case 150 and connected with the refrigerant circulation line (R) so as to exchange heat between the refrigerant circulating the refrigerant circulation line (R) and the outdoor air.

Here, the exterior heat exchanger 130 is mounted at the front side of an engine room of the vehicle to exchange heat between the refrigerant flowing inside the exterior heat exchanger 130 and the outdoor air.

In the air-conditioning mode, the exterior heat exchanger 130 serves as a condenser like the interior heat exchanger 110, and in this instance, the refrigerant of high-temperature and high-pressure flowing inside the exterior heat exchanger 130 is condensed while heat-exchanging with the outdoor air. In the heat pump mode (first heating mode), the exterior heat exchanger 130 serves as an evaporator differently from the interior heat Exchanger 110, and in this instance, refrigerant of low-temperature flowing inside the exterior heat exchanger 130 is evaporated while heat-exchanging with the outdoor air.

Moreover, the first expansion means 120 is mounted on the refrigerant circulation line (R) between the interior heat exchanger 110 and the exterior heat exchanger 130 in order to selectively expand the refrigerant supplied to the exterior heat exchanger 130 according to the air-conditioning mode or the heat pump mode.

That is, the expansion line (R3) is mounted in parallel on the refrigerant circulation line (R) between the interior heat exchanger 110 and the exterior heat exchanger 130, and in this instance, the first expansion means 120 has the orifice 121 mounted on the expansion line (R3).

Moreover, the two-way valve 122 for changing a flow direction of the refrigerant so that the refrigerant passing the interior heat exchanger 110 passes the orifice 121 through the expansion line (R3) or bypasses the orifice 121 according to the air-conditioning mode or the heat pump mode is mounted at the branching point of the expansion line (R3) and the refrigerant circulation line (R).

Therefore, in the air-conditioning mode, the refrigerant discharged from the compressor 100 and passing through the interior heat exchanger 110 bypasses the orifice 121 by the two-way valve 122 and is supplied to the exterior heat exchanger 130. In the heat pump mode (first heating mode), the refrigerant discharged from the compressor 100 and passing through the interior heat exchanger 110 is expanded while passing through the orifice 121 by the two-way valve 122 and is supplied to the exterior heat exchanger 130.

In the meantime, the orifice 121 and the two-way valve 122 of the first expansion means 120 may be formed in a separate type or an integrated type.

Additionally, the bypass line (R1) is mounted in such a way as to connect the refrigerant circulation line (R) of the inlet side of the second expansion means 140 and the refrigerant circulation line (R) of the outlet side of the evaporator 160 with each other, so that the refrigerant circulating through the refrigerant circulation line (R) selectively bypasses the second expansion means 140 and the evaporator 160.

As shown in the drawings, the bypass line (R1) is arranged in parallel with the second expansion means 140 and the evaporator 160. That is, the inlet side of the bypass line (R1) is connected with the refrigerant circulation line (R) which connects the exterior heat exchanger 130 and the second expansion means 140 with each other, and the outlet side is connected with the refrigerant circulation line (R) which connects the evaporator 160 and the compressor 100 with each other.

As a result, in the air-conditioning mode, the refrigerant passing through the interior heat exchanger 130 flows toward the second expansion means 140 and the evaporator 160, but, in the heat pump mode (first heating mode), the refrigerant passing through the exterior heat exchanger 130 directly flows toward the compressor 100 through the bypass line (R1) and bypasses the second expansion means 140 and the evaporator 160.

Here, the change in flow direction of the refrigerant according to the air-conditioning mode and the heat pump mode is achieved by the first direction changing valve 191.

The first direction changing valve 191 is mounted at a branching point of the bypass line (R1) and the refrigerant circulation line (R) so as to change the flow direction of the refrigerant in such a manner that the refrigerant passing through the exterior heat exchanger 130 flows toward the bypass line (R1) or the second expansion means 140 according to the air-conditioning mode or the heat pump mode.

In this instance, in the air-conditioning mode, the first direction changing valve 191 changes the flow direction of the refrigerant in such a manner that the refrigerant discharged from the compressor 100 and passing through the interior heat exchanger 110 and the exterior heat exchanger 130 flows toward the second expansion means 140 and the evaporator 160, and in the heat pump mode (first heating mode), the first direction changing valve 191 changes the flow direction of the refrigerant in such a manner that the refrigerant discharged from the compressor 100 and passing through the interior heat exchanger 110, the first expansion means 120 and the exterior heat exchanger 130 flows toward the bypass line (R1).

In the meantime, it is preferable that the first direction changing valve 191 is mounted at the branching point of the inlet side of the bypass line (R1) and uses a three-way valve.

Besides the first direction changing valve 191, preferably, the second direction changing valve preferably uses the three-way valve.

A heat supply means 180 for supplying heat to the refrigerant flowing along the bypass line (R1) is mounted on the bypass line (R1).

The heat supply means 180 has a water-cooled type heat exchanger 181 including: a refrigerant heat exchange part 181a in which the refrigerant flowing in the bypass line (R1) flows so as to supply waste heat of electronic units 200 of the vehicle to the refrigerant flowing in the bypass line (R1); and a cooling water heat exchange part 181b in which cooling water circulating the electronic units 200 flows, the cooling water heat exchange part 181b being disposed at one side of the refrigerant heat exchange part 181a.

Therefore, in the heat pump mode, the heat pump system can enhance heating performance by recovering a heat source from the waste heat of the electronic units 200 of the vehicle.

In the meantime, there are motors, inverters and others as the electronic units 200 of the vehicle.

Moreover, an accumulator 170 is mounted on the refrigerant circulation line (R) of the inlet side of the compressor 100.

The accumulator 170 divides the refrigerant which is supplied to the compressor 100 into the liquid-phase refrigerant and the gas-phase refrigerant and supplies only the gas-phase refrigerant to the compressor 100.

Moreover, an electric heater 115 for enhancing a heating efficiency is further mounted at the downstream side of the interior heat exchanger 110 inside the air-conditioning case 150.

That is, the heat pump system can enhance heating performance by operating the electric heater 115 at the beginning to start the vehicle as an auxiliary heat source, and can also operate the electric heater 115 when the heat pump system is lacking in the heat source.

It is preferable that the electric heater 115 is a PTC heater.

In addition, the auxiliary bypass line (R2) is mounted in parallel on the refrigerant circulation line (R) in such a manner that the refrigerant selectively passing the first expansion means 120 bypasses the exterior heat exchanger 130.

In other words, the auxiliary bypass line (R2) is mounted to connect the refrigerant circulation lines (R) of the inlet and outlet sides of the exterior heat exchanger 130 so that the refrigerant circulating through the refrigerant circulation line (R) bypasses the exterior heat exchanger 130.

Moreover, a second direction changing valve 192 for changing a flow direction of the refrigerant is mounted in such a manner that the refrigerant circulating the refrigerant circulation line (R) selectively flows to the auxiliary bypass line (R2).

the second direction changing valve 192 is mounted at the branching point of the auxiliary bypass line (R2) and the refrigerant circulation line (R) so as to change the flow direction of the refrigerant, such that the refrigerant flows toward the exterior heat exchanger 130 or the auxiliary bypass line (R2).

In this instance, when frosting is generated on the exterior heat exchanger 130 or when the outdoor temperature is below zero, because the exterior heat exchanger 130 cannot smoothly inhale heat from the outdoor air, the second direction changing valve 192 makes the refrigerant circulating the refrigerant circulation line (R) bypass the exterior heat exchanger 130.

In the meantime, it is not necessary that the outdoor temperature is essentially 0° C. The heat pump system passes the refrigerant to the exterior heat exchanger 130 only when heat-exchange efficiency between the outdoor air and the refrigerant flowing in the exterior heat exchanger 130 is good but bypasses the refrigerant when the heat-exchange efficiency is not good, thereby enhancing heating performance and efficiency.

Furthermore, in the case that frosting is generated on the exterior heat exchanger 130, when refrigerant flows to the auxiliary bypass line (R2) and bypasses the exterior heat exchanger 130, frosting may be delayed or removed.

Additionally, the dehumidification lien (R4) is mounted on the refrigerant circulation line (R) for supplying some of the refrigerant circulating the refrigerant circulation line (R) to the evaporator 160 so as to carry out dehumidification of the interior of the vehicle.

In this instance, in order to dehumidify the interior of the vehicle, because refrigerant of low temperature must be supplied to the evaporator 160, the dehumidification line (R4) is connected with a section where the refrigerant of low temperature circulates in the refrigerant circulation line (R).

In more detail, the dehumidification line (R4) supplies some of the refrigerant passing the first expansion means 120 to the evaporator 160.

In other words, the dehumidification line (R4) connects the refrigerant circulation line (R) of the outside side of the first expansion means 120 and the refrigerant circulation line (R) of the inlet side of the evaporator 160 with each other.

In the drawings, the inlet of the dehumidification line (R4) is connected to the refrigerant circulation line (R) between the first expansion means 120 and the exterior heat exchanger 130, such that some of the refrigerant flows to the dehumidification line (R4) and is supplied to the evaporator 160 before being introduced into the exterior heat exchanger 130 after passing the first expansion means 120.

Moreover, in the dehumidification mode, some of the refrigerant circulating the refrigerant circulation line (R) is supplied to the evaporator 160 through the dehumidification line (R4), and in this instance, in order to secure heating performance, a flow amount of the refrigerant branched from the refrigerant circulation line (R) to the dehumidification line (R4) must be relative small.

Therefore, in order to make the flow amount of refrigerant branched to the dehumidification line (R4) become smaller than the flow amount of the refrigerant circulating the refrigerant circulation line (R), the following two methods may be used.

First, a pipe diameter of the dehumidification line (R4) is smaller than a pipe diameter of the refrigerant circulation line (R) of the outlet side of the first expansion means 120, such that the flow amount of refrigerant branched to the dehumidification line (R4) becomes smaller.

Second, a pipe of the dehumidification line (R4) is connected in such a way as to be branched above a pipe of the refrigerant circulation line (R), such that the flow amount of refrigerant branched to the dehumidification line (R4) becomes smaller.

That is, if the pipe of the dehumidification line (R4) is connected in such a way as to be branched above the pipe of the refrigerant circulation line (R), when the refrigerant circulating the refrigerant circulation line (R) is branched toward the dehumidification line (R) located above, the flow amount of the refrigerant branched to the dehumidification line (R4) becomes smaller by gravity (self-weight).

Moreover, the on-off valve 195 which opens and closes the dehumidification line (R4) is mounted on the dehumidification line (R4), such that some of the refrigerant passing the first expansion means 120 can flow to the dehumidification line (R4) only in the dehumidification mode.

Furthermore, the heat pump system further includes a controller (not shown) for controlling the on-off valve 195.

The controller opens the dehumidification line (R4) by opening the on-off valve 195 only in the dehumidification mode, and closes the dehumidification line (R4) by closing the on-off valve 195 not in the dehumidification mode.

Additionally, in the humidification mode, the controller turns off the on-off valve 195 when frosting of the evaporator 160 is determined or frosting is sensed, and blocks the refrigerant supplied to the evaporator 160 through the dehumidification line (R4) so as to prevent frosting of the evaporator 160 in the dehumidification mode.

As described above, in the dehumidification mode, some of the refrigerant is supplied to the evaporator 160 through the dehumidification line (R4) before the refrigerant is introduced into the exterior heat exchanger 130 after passing the first expansion means 120. In this case, because the refrigerant flowing in the dehumidification line (R4) is the refrigerant before being introduced into the exterior heat exchanger 130, in other words, because the refrigerant flowing in the dehumidification line (R4) does not yet heat-exchange with cold outdoor air in the exterior heat exchanger 130, pressure of the refrigerant flowing in the dehumidification line (R4) is higher than pressure of the evaporator 160.

Figure 5:
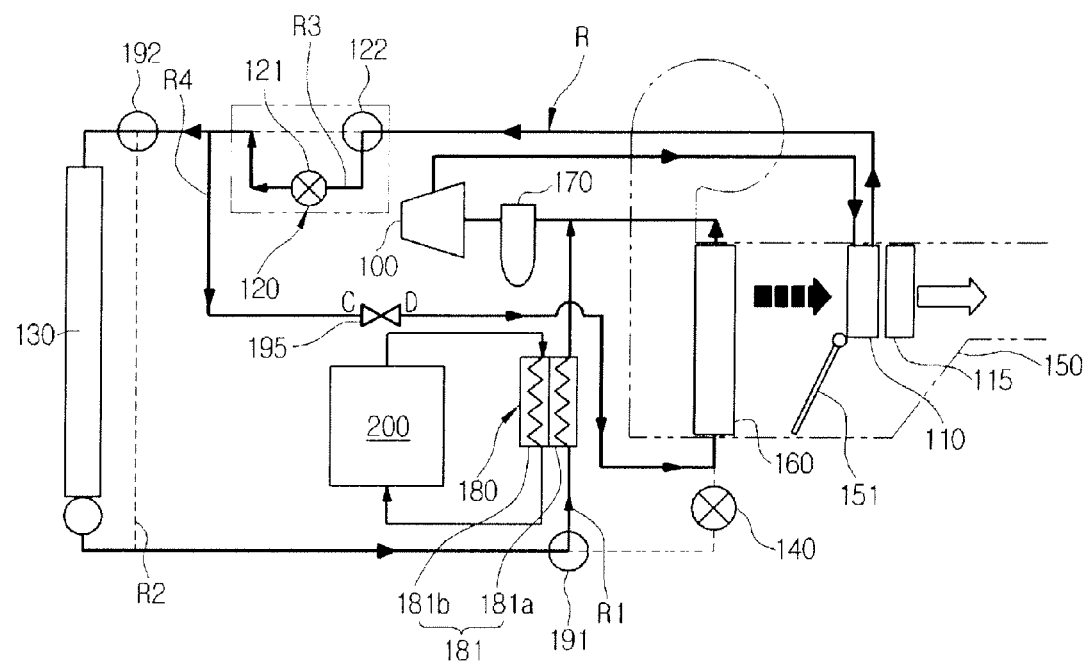
FIG. 5 is a configurative diagram of a dehumidification mode while carrying out the first heating mode of the heat pump mode of the heat pump system for the vehicle according to the preferred embodiment of the present invention.

That is, referring to FIG. 5, based on the on-off valve 195 of the dehumidification line (R4), because pressure of the C side is higher than pressure of the D side (evaporator side), in the dehumidification mode, when the on-off valve 195 is opened, some of the refrigerant passing the first expansion means 120 smoothly flows to the evaporator 160 of a lower pressure through the dehumidification line (R4), and hence, the heat pump system can smoothly carry out dehumidification of the interior of the vehicle.

Figure 8:
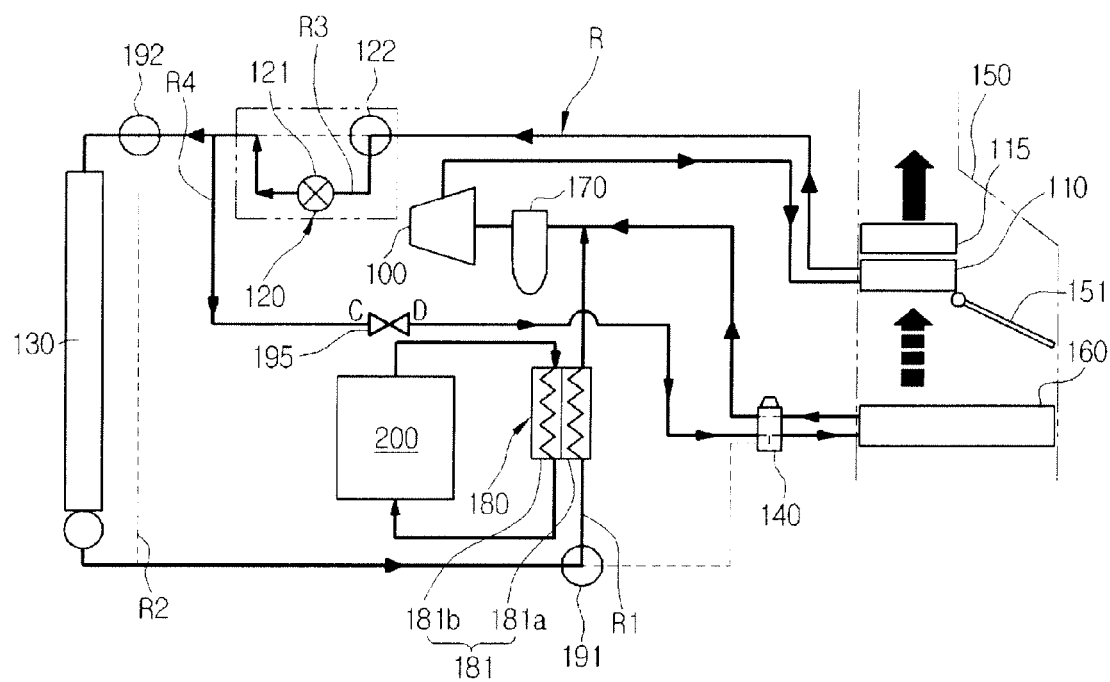
FIG. 8 is a configurative diagram showing that an outlet of a dehumidification line of FIG. 5 is connected to a bypass line of the second expansion means.

In addition, as shown in FIGS. 3 to 7, the outlet of the dehumidification line (R4) is connected with the refrigerant circulation line (R) of the inlet side of the evaporator 160, or as shown in FIG. 8, is connected with the second expansion means 140.

In FIGS. 3 to 7, the outlet of the dehumidification line (R4) is connected with the refrigerant circulation line (R) between the second expansion means 140 and the evaporator 160. Therefore, the refrigerant passing the dehumidification line (R4) is directly introduced into the evaporator 160.

In FIG. 8, the outlet of the dehumidification line (R4) is connected with the second expansion means 140, but in this instance, the refrigerant passing the dehumidification line (R4) is not expanded in the second expansion means 140 but is introduced into the evaporator 160.

Figure 9:
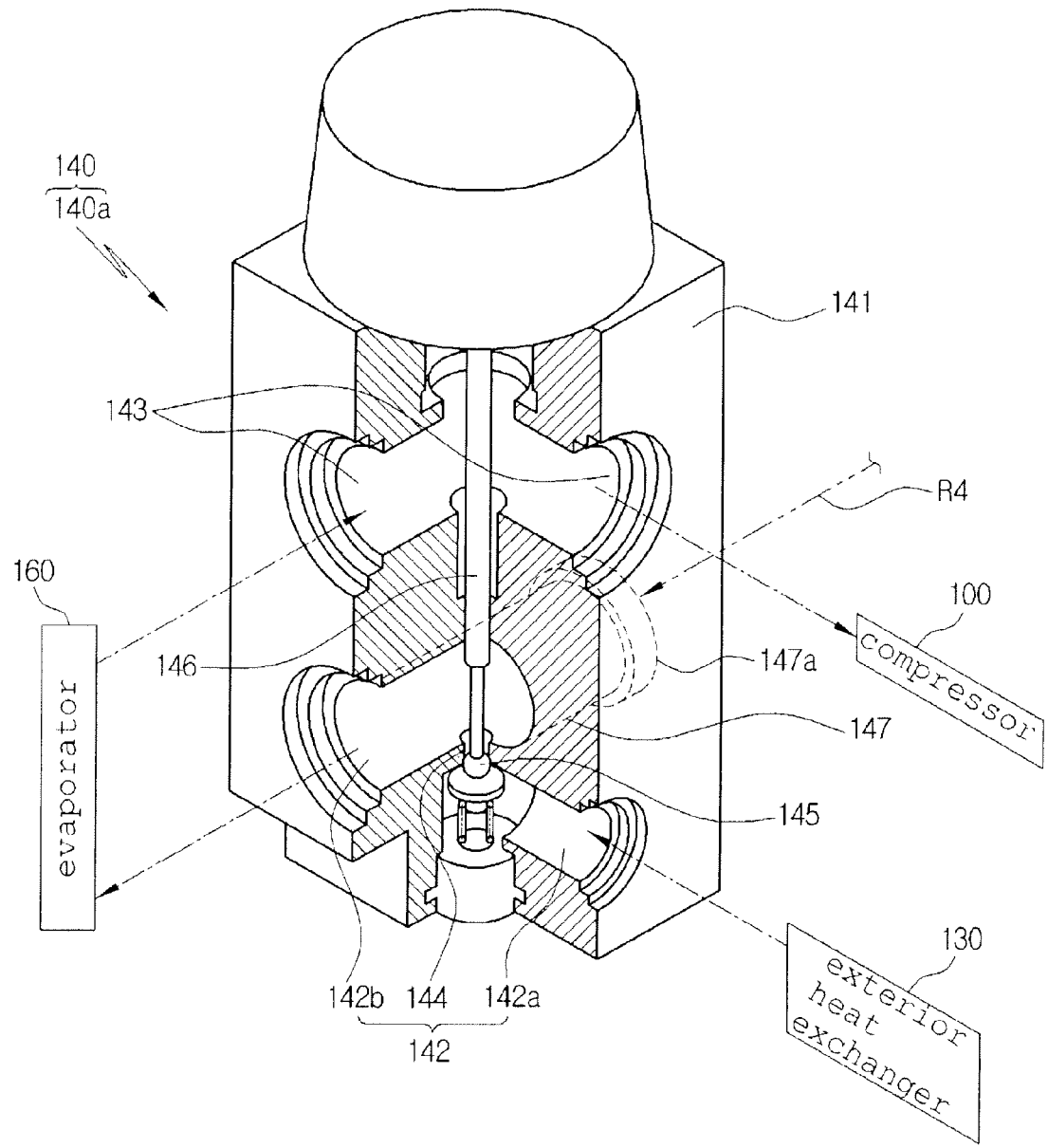
FIG. 9 is a perspective view of an expansion valve of FIG. 8.

That is, as shown in FIG. 9, the second expansion means 140 includes an expansion valve 140a having an expansion flow channel 144 for expanding the refrigerant and a bypass flow channel 147 for making the refrigerant bypass the expansion flow channel 144.

In this instance, the outlet of the dehumidification line (R4) is connected with the bypass flow channel 147 of the expansion valve 140a, and the refrigerant passing the dehumidification line (R4) bypasses the expansion flow channel 144 through the bypass flow channel 147 and is supplied to the evaporator 160.

Referring to FIG. 9, the expansion valve 140a of the second expansion means 140 will be described in brief. The expansion valve 140a includes: a main body 141 having a first flow channel 142 which has the expansion flow channel 144 for expanding the refrigerant supplied to the evaporator 160 and a second flow channel 143 in which the refrigerant discharged from the evaporator 160 flows; a valve body 145 mounted inside the main body 141 for regulating a flow amount of the refrigerant passing the expansion flow channel 144 by controlling the degree of opening of the expansion flow channel 144; and a rod 146 elevatably mounted inside the main body 141 for lifting the valve body 145 according to a temperature change of the refrigerant of the outlet side of the evaporator 160 which flows in the second flow channel 143.

Here, the main body 141 of the expansion valve 140a includes: an inlet 142a for introducing refrigerant to the expansion flow channel 144; and an outlet 142b for discharging out the refrigerant passing the expansion flow channel 144.

Inside the main body 141, the inlet 142a and the outlet 142b are arranged at an angle of 90 degrees, and in this instance, they are spaced apart from each other at a predetermined interval in a perpendicular direction, and the expansion flow channel 144 is formed between the inlet 142a and the outlet 142b.

Moreover, a diaphragm (not shown) which is displaced according to the temperature change of the refrigerant flowing in the second flow channel 143 is mounted at the upper end of the main body 141. Therefore, the valve body 145 is operated while the rod 146 is ascending and descending according to the displacement of the diaphragm.

Furthermore, the bypass flow channel 147 to which the dehumidification line (R4) is connected is formed in the main body 141, and is communicated with the outlet 142b of the first flow channel 142 which is the downstream side of the expansion flow channel 144 in the refrigerant flow direction.

In this instance, the inlet 147a of the bypass flow channel 147 is arranged collinearly with the outlet 142b of the first flow channel 142.

In other words, the inlet 147a of the bypass flow channel 147 and the outlet 142b of the first flow channel 142 are formed in a straight line.

Therefore, the refrigerant passing the dehumidification line (R4) bypasses the expansion flow channel 144 of the second expansion means 140 through the bypass flow channel 147 and is directly supplied to the evaporator 160.

Moreover, because the bypass flow channel 147 is formed in a straight line with the outlet 142b of the first flow channel 142, the heat pump system can minimize a pressure loss and a flow noise of the refrigerant.

In the meantime, because the outlet of the dehumidification line (R4) is inserted into the bypass flow channel 147 of the second expansion means 140, the dehumidification line (R4) can be simply assembled, and the number of components and weight of the system can be reduced due to the simple connection structure.

Hereinafter, the action of the heat pump system for the vehicle according to the preferred embodiment of the present invention will be described.

A. Air-Conditioning Mode (Cooling Mode) (See FIG. 3).

In the air-conditioning mode (cooling mode), as shown in FIG. 3, the auxiliary bypass line (R2) is closed by the second direction changing valve 192, the bypass line (R1) is also closed by the first direction changing valve 191, and the two-way valve 122 closes the orifice 121.

Moreover, the cooling water circulating through the electronic units 200 is not supplied to the water cooling type heat exchanger 181 of the heat supplying means 180.

Meanwhile, in order to achieve the maximum cooling, the temperature adjustable door 151 inside the air-conditioning case 150 closes the passage passing through the interior heat exchanger 110, so that the air blown into the air-conditioning case 150 by the blower is cooled while passing through the evaporator 160 and is supplied to the interior of the vehicle by bypassing the interior heat exchanger 110 to thereby cool the interior of the vehicle.

Continuously, a refrigerant circulation process will be described.

The gas-phase refrigerant of high-temperature and high-pressure discharged after being compressed in the compressor 100 is supplied to the interior heat exchanger 110 mounted inside the air-conditioning case 150.

As shown in FIG. 3, the refrigerant supplied to the interior heat exchanger 110 directly flows to the exterior heat exchanger 130 without heat-exchanging with the air because the temperature adjustable door 151 closes the passage of the interior heat exchanger 110.

The refrigerant flowing to the exterior heat exchanger 130 is condensed while heat-exchanging with the outdoor air, and thereby, the gas-phase refrigerant is converted into the liquid-phase refrigerant.

In the meantime, all of the interior heat exchanger 110 and the exterior heat exchanger 130 serve as the condensers, but the refrigerant is mainly condensed in the exterior heat exchanger 130 which heat-exchanges with the outdoor air.

Continuously, the refrigerant passing through the exterior heat exchanger 130 is decompressed and expanded while passing through the second expansion means 140 to thereby become a liquid-phase refrigerant of low-temperature and low-pressure, and then, is introduced into the evaporator 160.

The refrigerant introduced into the evaporator 160 is evaporated by heat-exchanging with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is introduced into the compressor 100 and recirculates the above cycle.

B. First Heating Mode of Heat Pump Mode (See FIG. 4).

The first heating mode of the heat pump mode is operated under the condition that there is no frosting on the exterior heat exchanger 130 or that the outdoor temperature is above zero. As shown in FIG. 4, the auxiliary bypass line (R2) is opened by the second direction changing valve 192 and the bypass line (R1) is opened by the first direction changing valve 191, such that the refrigerant is not supplied to the second expansion means 140 and the evaporator 160.

Moreover, the orifice 121 is opened by the two-way valve 122.

Meanwhile, the cooling water heated by the electronic units 200 of the vehicle is supplied to the cooling water heat-exchanging part 181b of the water cooling type heat exchanger 181 of the heat supplying means 180.

Furthermore, in the first heating mode, the temperature adjustable door 151 inside the air-conditioning case 150 closes the passage bypassing the interior heat exchanger 110, so that the air blown into the air-conditioning case 150 by the blower is changed into warm air while passing through the interior heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the interior heat exchanger 110 mounted inside the air-conditioning case 150.

The gas-phase refrigerant of high-temperature and high-pressure introduced into the interior heat exchanger 110 is condensed while heat-exchanging with the air blown into the air-conditioning case 150 by the blower, and in this instance, the air passing through the interior heat exchanger 110 is converted into warm air and supplied to the interior of the vehicle to thereby heat the interior of the vehicle.

Continuously the refrigerant discharged from the interior heat exchanger 110 is decompressed and expanded while passing through the orifice 121 by the two-way valve 122 to thereby become a liquid-phase refrigerant of low-temperature and low-pressure, and then, is supplied to the exterior heat exchanger 130 which serves as an evaporator.

The refrigerant supplied to the exterior heat exchanger 130 is evaporated while heat-exchanging with the indoor air and passes the bypass line (R1) by the first direction changing valve 191. In this instance, the refrigerant passing the bypass line (R1) heat-exchanges with the cooling water passing through the cooling water heat-exchanging part 181b while passing through the refrigerant heat-exchanging part 181a of the water cooling type heat exchanger 181 so as to recover the waste heat of the electronic units 200 of the vehicle, and then, is introduced into the compressor 100 to recirculate the above cycle.

C. Dehumidification Mode of First Heating Mode of Heat Pump Mode (See FIG. 5)

The dehumidification mode of the first heating mode of the heat pump mode is operated only in the case that dehumidification of the interior of the vehicle is needed while the system is operated in the first heating mode of FIG. 4.

Therefore, only different parts from the first heating mode of FIG. 4 will be described.

In the dehumidification mode, the dehumidification line (R4) is additionally opened by the on-off valve 195 in the state where the first heating mode is operated.

Moreover, the temperature-adjusting door 151 inside the air-conditioning case 150 closes a passageway bypassing the interior heat exchanger 110. Therefore, air blown into the air-conditioning case 150 by a blower is cooled while passing the evaporator 160, and then, is changed into warm air while passing the interior heat exchanger 110 and is supplied to the interior of the vehicle, such that the heat pump system can heat the interior of the vehicle.

In this instance, because the amount of the refrigerant supplied to the evaporator 160 is small and an air cooling performance is low, it minimizes a change of indoor temperature, such that the heat pump system can smoothly dehumidify the air passing the evaporator 160.

Continuously, a refrigerant circulation process will be described.

Some of the refrigerant passing the compressor 100, the interior heat exchanger 110, and the orifice 121 of the first expansion means 120 passes the exterior heat exchanger 130, and some of the refrigerant passes the dehumidification line (R4).

The refrigerant passing the exterior heat exchanger 130 is evaporated while heat-exchanging with the outdoor air, and then, passes the bypass line (R1) by the first direction changing valve 191. In this instance, the refrigerant passing the bypass line (R1) heat-exchanges with cooling water passing the cooling water heat exchange part 181b while passing the refrigerant heat exchange part 181a of the water-cooling type heat exchanger 181 so as to be evaporated while recovering waste heat of the electronic units 200 of the vehicle.

The refrigerant passing the dehumidification line (R4) is supplied to the evaporator 160, and is evaporated while heat-exchanging with the air flowing inside the air-conditioning case 150.

In the above process, the air passing the evaporator 160 is dehumidified, and the dehumidified air is changed into warm air while passing the interior heat exchanger 110, and then, is supplied to the interior of the vehicle so as to carry out dehumidification.

After that, the refrigerants respectively passing the water-cooling type heat exchanger 181 and the evaporator 160 meet together and are introduced into the compressor 100, and then, the above-mentioned cycle is re-circulated.

D. Second Heating Mode of Heat Pump Mode (See FIG. 6).

Figure 6:
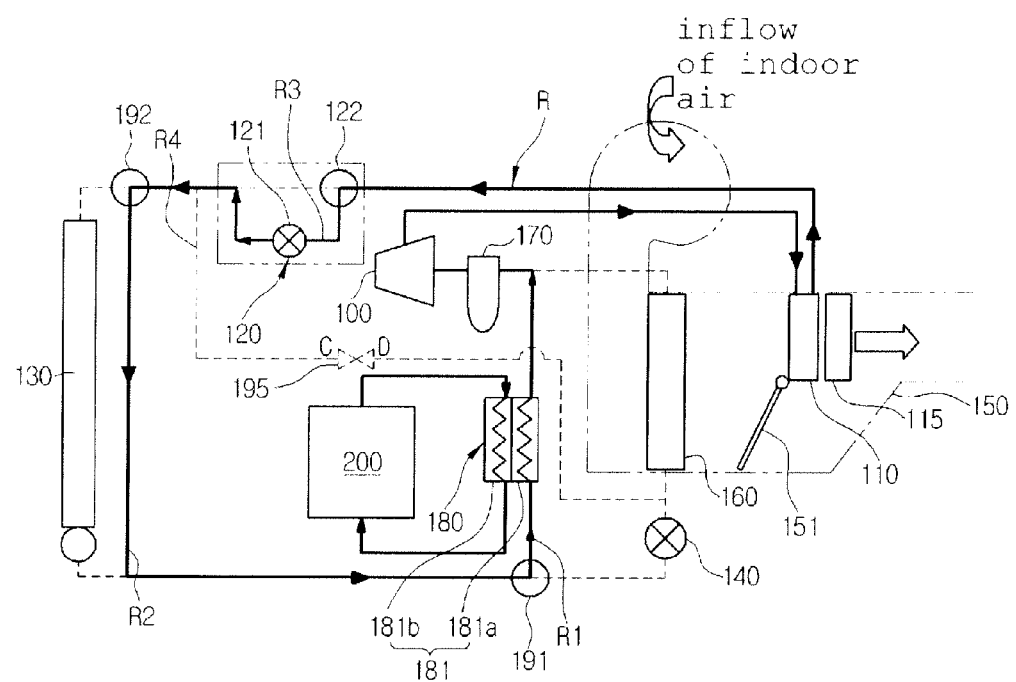
FIG. 6 is a configurative diagram of a second heating mode of the heat pump mode of the heat pump system for the vehicle according to the preferred embodiment of the present invention.
Figure 7:
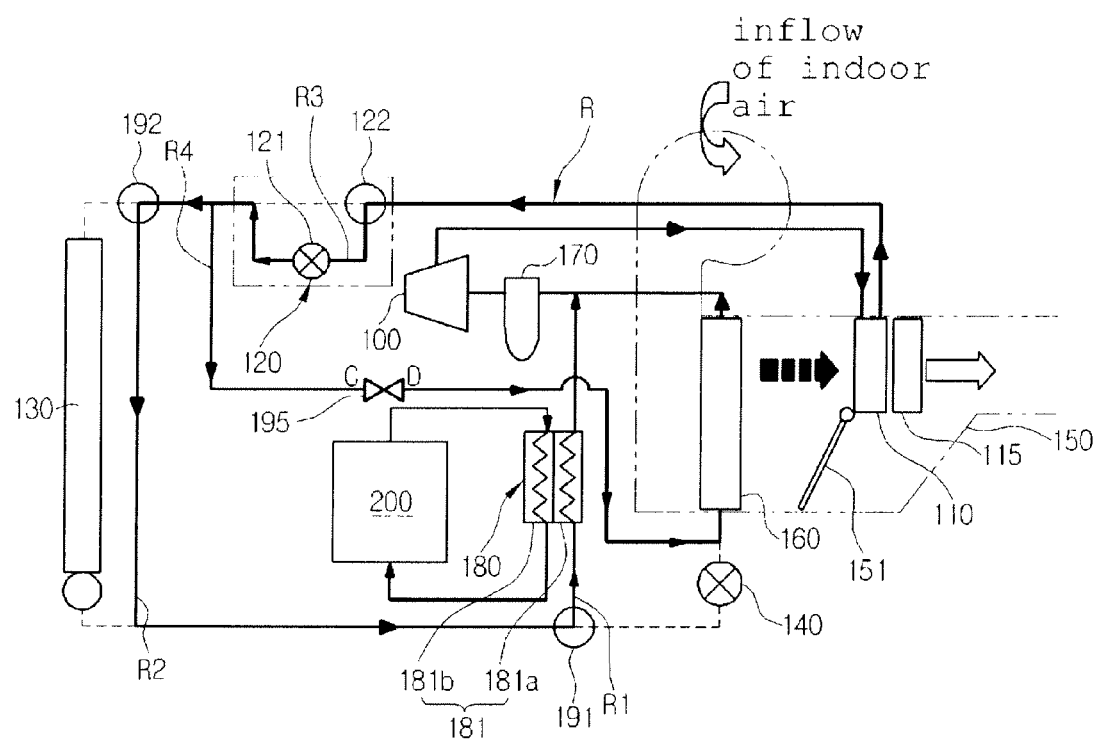
FIG. 7 is a configurative diagram of a dehumidification mode while carrying out the second heating mode of the heat pump mode of the heat pump system for the vehicle according to the preferred embodiment of the present invention.

The second heating mode of the heat pump mode is operated under the condition that frosting is generated on the exterior heat exchanger 130 or that the outdoor temperature is below zero. As shown in FIG. 6, the auxiliary bypass line (R2) is opened by the second direction changing valve 192 and the bypass line (R1) is opened by the first direction changing valve 191.

Moreover, the dehumidification lien (R4) is closed by the on-off valve 195, the orifice 121 is opened by the two-way valve 122, and the mode is converted into an indoor air inflow mode for introducing the indoor air into the air-conditioning case 150.

Meanwhile, the cooling water heated by the electronic units 200 of the vehicle is supplied to the cooling water heat-exchanging part 181b of the water cooling type heat exchanger 181 of the heat supplying means 180.

Furthermore, in the second heating mode, the temperature adjustable door 151 inside the air-conditioning case 150 closes the passage bypassing the interior heat exchanger 110, so that the air blown into the air-conditioning case 150 by the blower is changed into warm air while passing through the interior heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the interior heat exchanger 110 mounted inside the air-conditioning case 150.

The gas-phase refrigerant of high-temperature and high-pressure introduced into the interior heat exchanger 110 is condensed while heat-exchanging with the air blown into the air-conditioning case 150 by the blower, and in this instance, the air passing through the interior heat exchanger 110 is converted into warm air and supplied to the interior of the vehicle to thereby heat the interior of the vehicle.

Continuously the refrigerant discharged from the interior heat exchanger 110 is decompressed and expanded while passing through the orifice 121 by the two-way valve 122 to thereby become a liquid-phase refrigerant of low-temperature and low-pressure. After that, the refrigerant flows to the auxiliary bypass line (R2) and bypasses the exterior heat exchanger 130.

After that, the refrigerant passing through the auxiliary bypass line (R2) passes the bypass line (R1) by the first direction changing valve 191. In this instance, the refrigerant passing the bypass line (R1) heat-exchanges with the cooling water passing through the cooling water heat-exchanging part 181b while passing through the refrigerant heat-exchanging part 181a of the water cooling type heat exchanger 181 so as to recover the waste heat of the electronic units 200 of the vehicle, and then, is introduced into the compressor 100 to recirculate the above cycle.

E. Dehumidification Mode of Second Heating Mode of Heat Pump Mode (See FIG. 7)

The dehumidification mode of the second heating mode of the heat pump mode is operated only in the case that dehumidification of the interior of the vehicle is needed while the system is operated in the second heating mode of FIG. 6.

Therefore, only different parts from the second heating mode of FIG. 6 will be described.

In the dehumidification mode, the dehumidification line (R4) is additionally opened by the on-off valve 195 in the state where the second heating mode is operated.

Moreover, the temperature-adjusting door 151 inside the air-conditioning case 150 closes a passageway bypassing the interior heat exchanger 110. Therefore, air blown into the air-conditioning case 150 by a blower is cooled while passing the evaporator 160, and then, is changed into warm air while passing the interior heat exchanger 110 and is supplied to the interior of the vehicle, such that the heat pump system can heat the interior of the vehicle.

In this instance, because the amount of the refrigerant supplied to the evaporator 160 is small and an air cooling performance is low, it minimizes a change of indoor temperature, such that the heat pump system can smoothly dehumidify the air passing the evaporator 160.

Continuously, a refrigerant circulation process will be described.

Some of the refrigerant passing the compressor 100, the interior heat exchanger 110, and the orifice 121 of the first expansion means 120 bypasses the exterior heat exchanger 130 through the auxiliary bypass line (R2), and some of the refrigerant passes the dehumidification line (R4).

The refrigerant passing the auxiliary bypass line (R2) passes the bypass line (R1) by the first direction changing valve 191. In this instance, some of the refrigerant passing the bypass line (R1) heat-exchanges with cooling water passing the cooling water heat exchange part 181*b* while passing the refrigerant heat exchange part 181*a* of the water-cooling type heat exchanger 181 so as to be evaporated while recovering waste heat of the electronic units 200 of the vehicle.

The refrigerant passing the dehumidification line (R4) is supplied to the evaporator 160, and is evaporated while heat-exchanging with the air flowing inside the air-conditioning case 150.

In the above process, the air passing the evaporator 160 is dehumidified, and the dehumidified air is changed into warm air while passing the interior heat exchanger 110, and then, is supplied to the interior of the vehicle so as to carry out dehumidification.

After that, the refrigerants respectively passing the water-cooling type heat exchanger 181 and the evaporator 160 meet together and are introduced into the compressor 100, and then, the above-mentioned cycle is re-circulated.

What is claimed is:

1. A heat pump system for a vehicle comprising:
    a compressor mounted on a refrigerant circulation line for compressing and discharging refrigerant;
    an interior heat exchanger mounted inside an air-conditioning case for exchanging heat between air inside the air-conditioning case and the refrigerant discharged from the compressor;
    an evaporator mounted inside the air-conditioning case for exchanging heat between the air inside the air-conditioning case and the refrigerant supplied to the compressor;
    an exterior heat exchanger mounted outside the air-conditioning case for exchanging heat between the refrigerant circulating through the refrigerant circulation line and outdoor air;
    first expansion means mounted on the refrigerant circulation line located between the interior heat exchanger and the exterior heat exchanger for expanding refrigerant;
    second expansion means mounted on the refrigerant circulation line of an inlet side of the evaporator for expanding refrigerant;
    a bypass line mounted in such a way as to connect the refrigerant circulation line of an inlet side of the second expansion means and the refrigerant circulation line of an outlet side of the evaporator, such that refrigerant bypasses the second expansion means and the evaporator in a heat pump mode;
    a dehumidification line mounted on the refrigerant circulation line for supplying some of the refrigerant circulating the refrigerant circulation line to the evaporator so as to dehumidify an interior of the vehicle in the heat pump mode; and
    an auxiliary bypass line mounted on the refrigerant circulation line in order to make the refrigerant passing the first expansion means bypass the exterior heat exchanger when frosting is generated on the exterior heat exchanger,
    wherein the dehumidification line supplies some of the refrigerant passing the first expansion means to the evaporator,
    wherein the auxiliary bypass line is separate from the dehumidification line,
    wherein the second expansion means comprises an expansion valve having an expansion flow channel for expanding refrigerant and a bypass flow channel for making the refrigerant bypass the expansion flow channel, and wherein the dehumidification line connects the refrigerant circulation line of the outlet side of the first expansion means and the bypass flow channel of the expansion valve with each other, such that the refrigerant passing the dehumidification line bypasses the expansion flow channel through the bypass flow channel and is supplied to the evaporator.

2. The heat pump system according to claim 1, wherein the dehumidification line connects the refrigerant circulation line of the outlet side of the first expansion means and the refrigerant circulation line of the inlet side of the evaporator with each other.

3. The heat pump system according to claim 1, wherein the expansion valve comprises an inlet for introducing refrigerant into the expansion flow channel, and an outlet for discharging the refrigerant passing the expansion flow channel, and wherein an inlet of the bypass flow channel to which the dehumidification line is connected is arranged collinearly with the outlet.

4. The heat pump system according to claim 1, wherein an on-off valve for opening and closing the dehumidification line is mounted on the dehumidification line such that some of the refrigerant passing the first expansion means flows to the dehumidification line only in the dehumidification mode.

5. The heat pump system according to claim 4, further comprising a controller for controlling the on-off valve, wherein the controller controls an on-off function of the on-off valve in the dehumidification mode when frosting of the evaporator is determined or sensed, so as to prevent the refrigerant from being supplied to the evaporator through the dehumidification line.

6. The heat pump system according to claim 1, wherein a pipe diameter of the dehumidification line is smaller than a pipe diameter of the refrigerant circulation line of the outlet side of the first expansion means.

7. The heat pump system according to claim 1, wherein a pipe of the dehumidification line is connected in such a way as to be branched toward an upper part of a pipe of the refrigerant circulation line at an outlet side of the first expansion means in the direction of gravity.

8. The heat pump system according to claim 1, wherein heat supply means is mounted on the bypass line in order to supply waste heat of electronic units of the vehicle to the refrigerant flowing along the bypass line.

9. The heat pump system according to claim 1, wherein the dehumidification line supplies some of the refrigerant to the evaporator before the refrigerant is introduced into the exterior heat exchanger and after passing the first expansion means so as to dehumidify the interior of the vehicle in the heat pump mode, whereby the pressure of the refrigerant flowing in the dehumidification line is higher than the pressure of the evaporator.

10. A heat pump system for a vehicle comprising:
a compressor mounted on a refrigerant circulation line for compressing and discharging refrigerant;
an interior heat exchanger mounted inside an air-conditioning case for exchanging heat between air inside the air-conditioning case and the refrigerant discharged from the compressor;
an evaporator mounted inside the air-conditioning case for exchanging heat between the air inside the air-conditioning case and the refrigerant supplied to the compressor;
an exterior heat exchanger mounted outside the air-conditioning case for exchanging heat between the refrigerant circulating through the refrigerant circulation line and outdoor air;
first expansion means mounted on the refrigerant circulation line located between the interior heat exchanger and the exterior heat exchanger for expanding refrigerant;
second expansion means mounted on the refrigerant circulation line of an inlet side of the evaporator for expanding refrigerant;
a bypass line mounted in such a way as to connect the refrigerant circulation line of an inlet side of the second expansion means and the refrigerant circulation line of an outlet side of the evaporator, such that refrigerant bypasses the second expansion means and the evaporator in a heat pump mode;
a dehumidification line mounted on the refrigerant circulation line for supplying some of the refrigerant circulating the refrigerant circulation line to the evaporator so as to dehumidify an interior of the vehicle in the heat pump mode; and
an auxiliary bypass line mounted on the refrigerant circulation line in order to make the refrigerant passing the first expansion means bypass the exterior heat exchanger when frosting is generated on the exterior heat exchanger,
wherein the dehumidification line supplies some of the refrigerant passing the first expansion means to the evaporator,
wherein the auxiliary bypass line is separate from the dehumidification line,
wherein a pipe of the dehumidification line is connected in such a way as to be branched toward an upper part of a pipe of the refrigerant circulation line at an outlet side of the first expansion means in the direction of gravity.

* * * * *